United States Patent
Lv

(10) Patent No.: US 9,427,121 B2
(45) Date of Patent: Aug. 30, 2016

(54) GLASS-WIPING ROBOT HAVING AIR-VENTING DEVICE

(71) Applicant: Ecovacs Robotics Co., Ltd., Suzhou (CN)

(72) Inventor: Xiaoming Lv, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 0 days.

(21) Appl. No.: 14/431,260

(22) PCT Filed: Sep. 26, 2013

(86) PCT No.: PCT/CN2013/084335
§ 371 (c)(1),
(2) Date: Jun. 6, 2015

(87) PCT Pub. No.: WO2014/048347
PCT Pub. Date: Apr. 3, 2014

(65) Prior Publication Data
US 2015/0282684 A1    Oct. 8, 2015

(30) Foreign Application Priority Data

Sep. 26, 2012 (CN) .......................... 2012 1 0363960

(51) Int. Cl.
*A47L 1/02* (2006.01)
*A47L 11/38* (2006.01)
*B08B 1/00* (2006.01)

(52) U.S. Cl.
CPC .................. *A47L 1/02* (2013.01); *A47L 11/38* (2013.01); *B08B 1/006* (2013.01); *A47L 2201/00* (2013.01)

(58) Field of Classification Search
CPC .................................. A47L 1/02; A47L 11/38
See application file for complete search history.

(56) References Cited

U.S. PATENT DOCUMENTS 5,715,557 A * 2/1998 Hsu ........................... A47L 1/02
                                                           15/103
5,839,532 A   11/1998 Yoshiji
6,550,090 B1 * 4/2003 Jesadanont .............. A47L 1/02
                                                           15/103

FOREIGN PATENT DOCUMENTS

CN    1075246      8/1993
CN    1075246 A    8/1993
(Continued)

OTHER PUBLICATIONS

International Search Report and Written Opinion mailed Jan. 9, 2014 which issued in corresponding International Patent Application No. PCT/CN2013/084335 (18 pages).
(Continued)

*Primary Examiner* — Randall Chin
(74) *Attorney, Agent, or Firm* — Nixon Peabody LLP

(57) ABSTRACT

A glass-wiping robot having an air-venting device (5), comprising a machine body (1). The machine body (1) has arranged thereon a suction cup device (2). The suction cup device (2) is connected to a vacuum air pump (4) via an airway pipe (3). The glass-wiping robot is adsorbed on a surface of a glass via the suction cup device (2). The suction cup device (2) is also connected to an air-venting device (5). The air-venting device (5) is provided with opened and closed positions. When the air-venting device (5) is at the opened position, the suction cup device (2) is in communication with the atmosphere via the air-venting device (5). The glass-wiping robot has the air-venting device (5) arranged on the airway pipe (3) between the vacuum air pump (4) and the suction cup device (2), wherein when a handle (51) is pulled up, a positioning rotary shaft (53) rotates to trigger an air-venting valve (52), and the air-venting valve (52) opens an air-venting hole therein to allow the interior of the suction cup to be in communication with the atmosphere, thus an equilibrium between internal and external air pressures is achieved rapidly, the glass-wiping robot can be removed rapidly without having to wait, and the work efficiency is increased.

14 Claims, 3 Drawing Sheets

(56) References Cited

FOREIGN PATENT DOCUMENTS

| CN | 201405948 Y | 2/2010 |
|---|---|---|
| CN | 102591336 | 7/2012 |
| CN | 102616294 | 8/2012 |
| CN | 102616294 A | 8/2012 |
| CN | 102631173 | 8/2012 |
| CN | 102631173 A | 8/2012 |
| CN | 202376015 | 8/2012 |
| CN | 102657492 | 9/2012 |
| CN | 202908616 | 5/2013 |
| JP | H05-293061 | 11/1993 |
| KR | 20110137206 | 12/2011 |
| WO | WO 2006/083094 A1 | 8/2006 |

OTHER PUBLICATIONS

Chinese Official Action from the State Intellectual Property Office (SIPO), dated Feb. 23, 2016 (7 pages).

* cited by examiner

GLASS-WIPING ROBOT HAVING AIR-VENTING DEVICE

CROSS-REFERENCE TO RELATED APPLICATIONS

This application is an U.S. national stage of PCT/CN2013/084335, filed on Sep. 26, 2013, which claims priority to Chinese Patent Application No. 201210363960.5, filed on Sep. 26, 2012, the contents of which are each incorporated herein by reference in its entirety.

FIELD OF THE INVENTION

The present invention relates to a glass-wiping robot having an air-venting device, which belongs to the technical field of small household electrical appliances.

BACKGROUND OF THE PRIOR ART

The glass-wiping robot has been widely used owing to its characteristics of compact size and flexible movement. The existing glass-wiping robot (also referred to as "Winbot") moves under the driving of a walking mechanism provided on the machine body, as it is adsorbed on the surface of a glass to be cleaned after a suction cup provided on the machine body is vacuumized by a vacuum pump, so as to conduct a cleaning work on the surface of the glass to be cleaned. Upon the completion of the cleaning work, the vacuum pump stops, and the glass-wiping robot has to wait to be removed from the glass surface until the suction cup loses efficacy naturally. This process generally takes a certain period of time, and thus greatly effects the work efficiency of the glass-wiping robot.

SUMMARY OF THE INVENTION

In view of the above deficiencies in the prior art, the present invention provides a glass-wiping robot having an air-venting device, wherein after a handle of an air-venting valve is pulled up, a positioning rotary shaft rotates to trigger the air-venting valve, and then the air-venting valve opens an air-venting hole therein to allow the interior of the suction cup to be in communication with the atmosphere, thus an equilibrium between internal and external air pressures is achieved rapidly, and the glass-wiping robot can be removed rapidly without having to wait. Accordingly, the glass-wiping robot having an air-venting device has a simple structure and an improved work efficiency.

In the present invention, the following technical solutions are provided to solve the above technical problems.

A glass-wiping robot having an air-venting device comprises a machine body on which a suction cup device is provided. The suction cup device is connected to a vacuum air pump via an airway pipe. The glass-wiping robot is absorbed on a glass surface via the suction cup device. The suction cup device is also connected to an air-venting device having opened and closed positions. When the air-venting device is at the opened position, the suction cup device is in communication with the atmosphere via the air-venting device.

The air-venting device is disposed on the airway pipe which connects the vacuum air pump and the suction cup device. To facilitate connection, the suction cup device, the vacuum air pump and the air-venting device are connected via a tee junction. The airway pipe is a flexible pipe.

To be specific, the air-venting device comprises a handle and an air-venting valve connected to each other. The handle is connected to the air-venting valve via a positioning rotary shaft, one end of the positioning rotary shaft is fixed at the bottom of the handle and the other end is fixed at the top of an air-venting button.

More specifically, the air-venting valve comprises the air-venting button, a fixing pole and a valve core, wherein an air vent is provided at the top of the air-venting button, a reset spring is provided inside the air-venting button and is arranged around the valve core, the valve core is provided to pass through the middle of the fixing pole and then is positioned below the fixing pole via a boss fitted around the valve core. The valve core has a cylinder shape with a core hole provided in the center thereof. When the reset spring is in a state of compression, the air vent at the top of the air-venting button is in communication with the core hole of the valve core.

As described above, in the present invention, the air-venting device is disposed on the airway pipe which connects the vacuum air pump and the suction cup device so that when the handle of the air-venting valve is pulled up, the positioning rotary shaft rotates to trigger the air-venting valve, and the air-venting valve opens an air-venting hole therein to allow the interior of the suction cup to be in communication with the atmosphere, thus an equilibrium between internal and external air pressures is achieved rapidly, and the glass-wiping robot can be removed rapidly without having to wait. Thus, the work efficiency is increased.

Hereinafter, the technical solutions of the present invention will be described in detail in combination with the accompanying drawings and specific embodiments.

DESCRIPTION OF ATTACHED DRAWINGS

DETAILED DESCRIPTION OF PREFERRED EMBODIMENTS

Figure 1:
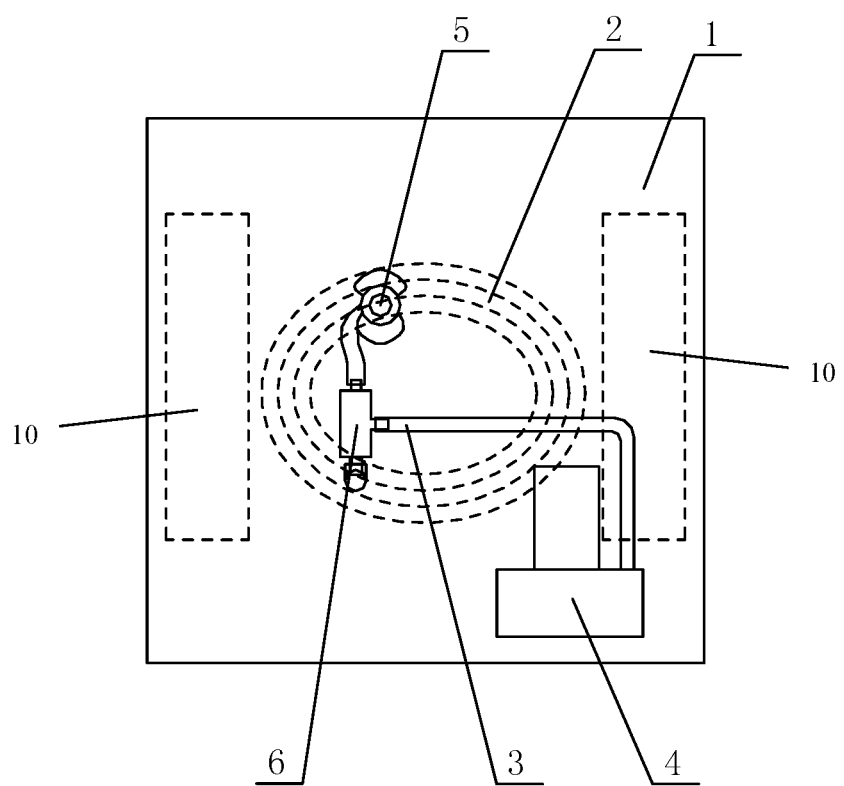
FIG. 1 is a schematic diagram of the overall structure of the present invention.
Figure 2:
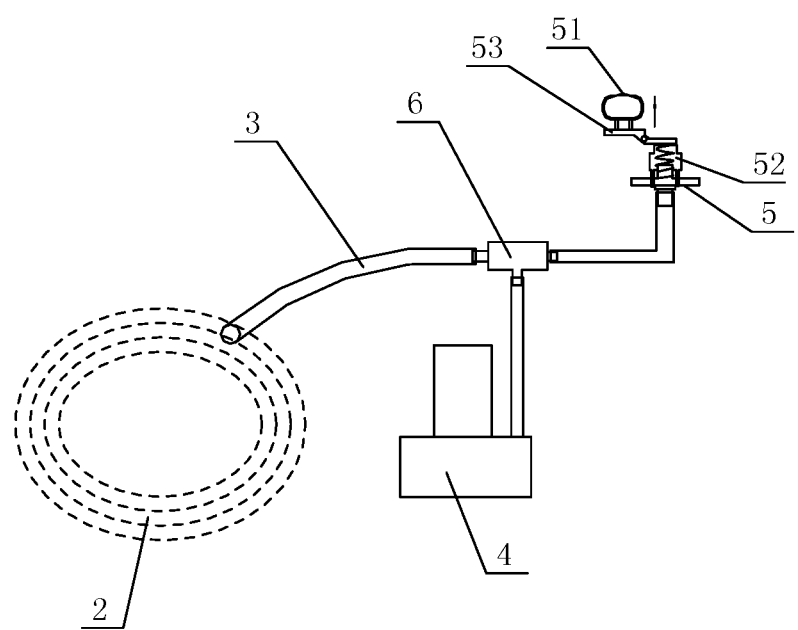
FIG. 2 is a schematic diagram of the partial structure of FIG. 1.

FIG. 1 is a schematic diagram of the overall structure of the present invention, and FIG. 2 is a schematic diagram of the partial structure of FIG. 1. As shown in FIG. 1 in combination with FIG. 2, a glass-wiping robot having an air-venting device according to the present invention comprises a machine body 1 on which a suction cup device 2 is provided. The suction cup device 2 is connected to a vacuum air pump 4 via an airway pipe 3, and the glass-wiping robot is adsorbed on a glass surface through the suction cup device 2. The suction cup device 2 is also connected to an air-venting device 5 provided with opened and closed positions. When the air-venting device 5 is at the opened position, the suction cup device 2 is in communication with the atmosphere via the air-venting device 5. The air-venting device 5 is disposed on the airway pipe 3 which connects the vacuum air pump 4 and the suction cup device 2. To facilitate the connection, the suction cup device 2, the vacuum air pump 4 and the air-venting device 5 are connected via a tee junction 6. The airway pipe 3 is a flexible pipe. To be specific, the air-venting device 5 comprises a handle 51 and an air-venting valve 52 connected to each other. The handle 51 is connected to the air-venting valve 52 via a positioning rotary shaft 53, one end of the positioning rotary shaft 53 is fixed at the bottom of the handle 51 and the other end is fixed at the top of an air-venting button 521.

Figure 3:
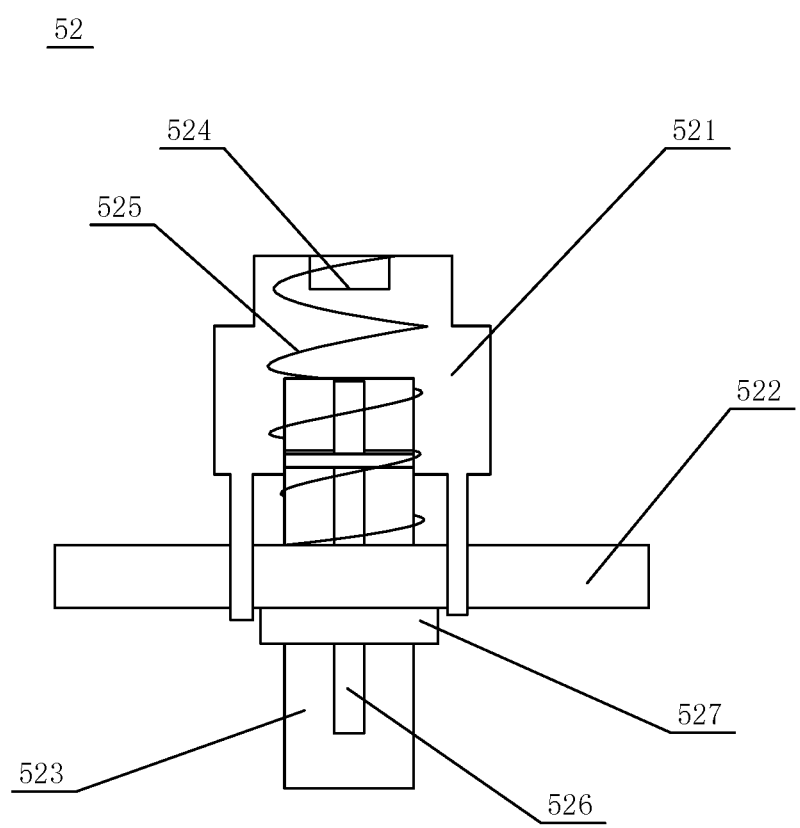
FIG. 3 is a schematic diagram of the partial structure of the air-venting valve.

FIG. 3 is a schematic diagram of the partial structure of the air-venting valve. As shown in FIG. 3, the air-venting valve 52 comprises the air-venting button 521, a fixing bar 522 and a valve core 523, wherein an air vent 524 is provided at the top of the air-venting button 521, a reset spring 525 is provided inside the air-venting button 521 and is arranged around the valve core 523, and the valve core 523 is provided to pass through the middle of the fixing pole 522 and then is positioned below the fixing pole 522 via a boss 527 fitted around the valve core 523. The valve core 523 has a cylinder shape with a core hole 526 provided in the center thereof. When the reset spring 525 is in a state of compression, the air vent 524 at the top of the air-venting button is in communication with the core hole 526 of the valve core.

The work process according to the present invention will be described in combination with FIGS. 1-3 as follow.

When the glass-wiping robot needs to perform a cleaning work on a surface of a glass to be cleaned, by the vacuum air pump 4, a vacuum treatment is performed on the suction cup 2 provided on the machine body, so as to enable the glass-wiping robot to be adsorbed on the surface of the glass to be cleaned. The machine body 1 moves under the driving of the walking mechanism 10 while being adsorbed, and thus performs the cleaning work on the surface of the glass to be cleaned. At this time, the handle 51 of the air-venting valve 52 is in a level condition. Under the tension of the reset spring 525, the air-venting button 521 is in a tensioning state, and the air vent 524 at the top of the air-venting button 521 and the core hole 526 of the valve core 523 are disconnected and are not in communication with each other. Only two ends, which are connected to the suction cup device 2 and the vacuum air pump 4, of the tee junction 6 are in an intercommunication state, and the suction cup device 2 is blocked off from the atmosphere.

When it is needed to remove the glass-wiping robot from the glass surface by releasing the suction cup device 2 upon the completion of the cleaning work, the handle 51 of the air-venting valve 52 is pulled up, and then the positioning rotary shaft 53 rotates. Accordingly, the end of the positioning rotary shaft 53 connected to the air-venting button 521 moves downward so that the reset spring 525 is compressed. The air vent 524 at the top of the air-venting button 521 is in communication with the core hole 526 of the valve core 523, and the suction cup device 2 is in communication with the atmosphere via the airway pipe 3, the tee junction 6, the core hole 526 and the air vent 524 in order, so that the suction cup device 2 is released, and an equilibrium between internal and external air pressures is achieved rapidly. Thus, the glass-wiping robot is removed immediately from the glass surface.

It should be emphasized that the air-venting device according to the present invention is not limited to the mechanism with the combination of the air-venting valve with the handle, and can also be realized by a simple structure in which for example one end of a separate gas-guiding tube is directly connected to the suction cup device and the other end is opened or closed by a sealing plug so that the suction cup device is in communication with or disconnected from the atmosphere.

As described above, in the present invention, the air-venting device is disposed on the airway pipe which connects the vacuum air pump and the suction cup device. After the handle of the air-venting valve is pulled up, the positioning rotary shaft rotates to trigger the air-venting valve, and the air-venting valve opens the air-venting hole therein to allow the interior of the suction cup to be in communication with the atmosphere. Accordingly, an equilibrium between the internal and external air pressures is achieved rapidly, and the glass-wiping robot can be removed rapidly without having to wait. Thus, the work efficiency is increased.

The invention claimed is:

1. A glass-wiping robot having an air-venting device, comprising a walking mechanism (10) and a machine body (1) on which a suction cup device (2) is provided, the suction cup device (2) is connected to a vacuum air pump (4) via an airway pipe (3), and the glass-wiping robot is adsorbed on a glass surface through the suction cup device (2) all the time during movement on the glass surface using the walking mechanism (10),
characterized in that,
the suction cup device (2) is also connected to an air-venting device (5) provided with opened and closed positions, and when the air-venting device (5) is at the opened position, the suction cup device (2) is in communication with the atmosphere via the air-venting device (5).

2. The glass-wiping robot having an air-venting device of claim 1, characterized in that, the air-venting device (5) is disposed on the airway pipe (3) which connects the vacuum air pump (4) and the suction cup device (2).

3. The glass-wiping robot having an air-venting device of claim 2, characterized in that, the suction cup device (2), the vacuum air pump (4) and the air-venting device (5) are connected via a tee junction (6).

4. The glass-wiping robot having an air-venting device of claim 2, characterized in that, the airway pipe (3) is a flexible pipe.

5. The glass-wiping robot having an air-venting device of claim 1, characterized in that, the air-venting device (5) comprises a handle (51) and an air-venting valve (52) connected to each other, the handle (51) is connected to the air-venting valve (52) via a positioning rotary shaft (53), one end of the positioning rotary shaft (53) is fixed at the bottom of the handle (51) and the other end is fixed at the top of an air-venting button (521).

6. The glass-wiping robot having an air-venting device of claim 5, characterized in that, the air-venting valve (52) comprises the air-venting button (521), a fixing pole (522) and a valve core (523), wherein an air vent (524) is provided at the top of the air-venting button (521), a reset spring (525) is provided inside the air-venting button (521) and is arranged around the valve core (523), the valve core (523) is provided to pass through the middle of the fixing pole (522) and then is positioned below the fixing pole (522) via a boss (527) fitted around the valve core (523), the valve core (523) has a cylinder shape with a core hole (526) provided in the center thereof, and when the reset spring (525) is in a state of compression, the air vent (524) at the top of the air-venting button (521) is in communication with the core hole (526) of the valve core.

7. A glass-wiping robot having an air-venting device, comprising a machine body (1) on which a suction cup device (2) is provided, the suction cup device (2) is connected to a vacuum air pump (4) via an airway pipe (3), and the glass-wiping robot is adsorbed on a glass surface through the suction cup device (2), characterized in that, the suction cup device (2) is also connected to an air-venting device (5) provided with opened and closed positions, and when the air-venting device (5) is at the opened position, the suction cup device (2) is in communication with the atmosphere via the air-venting device (5), and the air-venting device (5) comprises a handle (51) and an air-venting valve (52) connected to each other, the handle (51) is connected to the air-venting valve (52) via a positioning rotary shaft (53), one end of the positioning rotary shaft (53) is fixed at the bottom of the handle (51) and the other end is fixed at the top of an air-venting button (521).

8. The glass-wiping robot having an air-venting device of claim 7, characterized in that, the air-venting valve (52) comprises the air-venting button (521), a fixing pole (522) and a valve core (523), wherein an air vent (524) is provided at the top of the air-venting button (521), a reset spring (525) is provided inside the air-venting button (521) and is arranged around the valve core (523), the valve core (523) is provided to pass through the middle of the fixing pole (522) and then is positioned below the fixing pole (522) via a boss (527) fitted around the valve core (523), the valve core (523) has a cylinder shape with a core hole (526) provided in the center thereof, and when the reset spring (525) is in a state of compression, the air vent (524) at the top of the air-venting button (521) is in communication with the core hole (526) of the valve core.

9. A glass-wiping robot comprising:
a body;
a vacuum air pump;
an air-venting device configured to assume at least an open position and a closed position;
a drive mechanism, disposed at a first part of the body, configured to drive the glass-wiping robot along a glass surface; and
a suction cup device, disposed at a second part of the body different than the first part of the body, the suction cup device being communicatively connected to the vacuum air pump via at least a first airway pipe and communicatively connected to the air-venting device via at least a second airway pipe,
wherein, when the air-venting device is in the open position, the suction cup device is placed in communication with atmospheric pressure, and
wherein the glass-wiping robot is adsorbed on the glass surface, via the suction cup device, during all movement of the glass-wiping robot on the glass surface.

10. The glass-wiping robot according to claim 9, wherein the at least a first airway pipe and at least a second airway pipe are each communicatively connected to a common airway pipe physically connected to the suction cup device.

11. The glass-wiping robot according to claim 10, wherein the at least a first airway pipe and at least a second airway pipe are physically connected to the common airway pipe via a tee junction.

12. The glass-wiping robot according to claim 10, wherein at least one of the at least a first airway pipe, the at least a second airway pipe, or the common airway pipe comprise a flexible pipe.

13. The glass-wiping robot according to claim 9, wherein the air-venting device comprises a movable member.

14. The glass-wiping robot according to claim 9, wherein the air-venting device comprises an air-venting valve.

\* \* \* \* \*